US006934937B1

(12) United States Patent
Johnson et al.

(10) Patent No.: US 6,934,937 B1
(45) Date of Patent: Aug. 23, 2005

(54) MULTI-CHANNEL, MULTI-SERVICE DEBUG ON A PIPELINED CPU ARCHITECTURE

(75) Inventors: Kelly Gene Johnson, Milpitas, CA (US); Mark Williams, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/539,197

(22) Filed: Mar. 30, 2000

(51) Int. Cl.[7] .............................................. G06F 9/44
(52) U.S. Cl. .................... 717/129; 714/34; 714/35; 712/227; 712/228
(58) Field of Search ................................ 717/101, 124, 717/127, 129–135; 703/28; 345/619

(56) References Cited

U.S. PATENT DOCUMENTS

| | | | |
|---|---|---|---|
| 5,404,428 A | * 4/1995 | Wu | 345/619 |
| 5,488,688 A | 1/1996 | Gonzales et al. | 395/183.1 |
| 5,537,536 A | * 7/1996 | Groves | 714/28 |
| 5,922,070 A | 7/1999 | Swoboda et al. | 712/244 |
| 6,016,555 A | 1/2000 | Deao et al. | 714/35 |
| 6,065,106 A | * 5/2000 | Deao et al. | 712/24 |
| 6,112,298 A | * 8/2000 | Deao et al. | 712/227 |
| 6,205,560 B1 | * 3/2001 | Hervin et al. | 714/34 |
| 6,643,803 B1 | * 11/2003 | Swoboda et al. | 714/38 |

FOREIGN PATENT DOCUMENTS

EP        0 849 673 A2      6/1998

OTHER PUBLICATIONS

Wood, T.J., "The test and debug features of the AMD–K7/sup TM/ microprocessor," Proceedings of the International Test Conference, 1999., pp.: 130–136.*
Vranken, H., "Debug facilities in the TriMedia CPU64 architecture," Proceedings of the European Test Workshop 1999., pp.: 76–81.*
Jonathan b. Rosenberg; "How Debuggers Work: Algorithms, Data Structures, and Architectures"; Wiley Computer Publishing; 1996; pp. 39–53, 96–139.*
"Dictionary of Computing"; 4th Edition; Oxford University Press; 1996; pp. 72.*
International Search Report for Application No. PCT/US01/10251, filed on Mar. 30, 2001.

* cited by examiner

Primary Examiner—Kakali Chaki
Assistant Examiner—William H. Wood
(74) Attorney, Agent, or Firm—Christie, Parker & Hale, LLP

(57) ABSTRACT

A method and system for debugging an executing service on a pipelined CPU architecture are described. In one embodiment, a breakpoint within an executing service is set and a minimum state of the executing service is saved. In addition, a program counter of the executing service is altered. The program counter is restored and the state of the executing service is restored.

31 Claims, 11 Drawing Sheets

| 1 | ld32 r3, (r1 + 0) |
| 2 | ld32 r4, (r1 + 4) |
| 3 | ld32 r5, (r1 + 8) |
| 4 | add r6, r3, r4 |

Figure 7

| 1 | ld32 r3, (r1 + 0) |
| 2 | ld32 r3, (r1 + 4) |
| 3 | ld32 r3, (r1 + 8) |
| 4 | ld32 r3, (r1 + 12) |
| 5 | st32 (r1 + 0), r3 |
| 6 | st32 (r1 + 4), r3 |
| 7 | st32 (r1 + 8), r3 |
| 8 | st32 (r1 + 12), r3 |

Figure 8

| 1 | ld32 r3, (r1 + 0) |
| 2 | ld32 r4, (r1 + 0) |
| 3 | ld32 r5, (r1 + 0) |
| 4 | ld32 r6, (r1 + 0) |
| 5 | add r7, r5, r6 |

Figure 9

MULTI-CHANNEL, MULTI-SERVICE DEBUG ON A PIPELINED CPU ARCHITECTURE

FIELD OF THE INVENTION

The present invention relates to interactive debugging and more specifically to interactive debugging in a multi-channel, multi-service environment on a pipelined CPU architecture without hardware interlocking.

BACKGROUND OF THE INVENTION

Traditionally, Digital Signal Processors (DSPs) have been used to run single channels, such as, for example, a single DS0 or time division multiplexed (TDM) slot, that handle single services, such as modem, vocoder, or packet processing. Multiple services or multiple channels require multiple DSPs, each running its own small executive program (small kernel) and application. The executive programs reserve some area in memory for application code. When applications need to be switched, these executive programs overlay this memory with the new application.

Channels may take one of the following forms: one channel carried on a physical wire or wireless medium between systems (also referred to as a circuit); time division multiplexed (TDM) channels in which signals from several sources such as telephones and computers are merged into a single stream of data and separated by a time interval; and frequency division multiplexed (FDM) channels in which signals from many sources are transmitted over a single cable by modulating each signal on a carrier at different frequencies.

Recent advances in processing capacity now allow a single hip to run multiple channels. With this increase in capacity has come a desire to run different services simultaneously and to switch between services.

A current method to implement multiple services or multiple channels involves writing all control, overlay, and task-switching code for each service or channel. This requirement causes additional engineering overhead for development and debugging of the applications. In addition, not all services may fit into the memory available to the DSP, and the services must be swapped in from the host system. This swapping—overlaying—adds significant complexity to the implementation of the DSP services. The extra development activity consumes DSP application development time.

The fact that DSPs have a single thread of control creates problems to developing and debugging in the multi-channel, multi-service environment. Typically, debugging an application on a single chip stops all other applications and channels running on the chip. If the chip is running, real-time diagnostics on a channel or service cannot be obtained without interfering with the operation of the other channels and services. In addition, a debugging system typically needs to have direct access to the chip being diagnosed. That is, a conventional debugging system uses a special development board or a physical debug interface (such as Joint Test Access Group (JTAG) interface) to provide debugging access. This makes debugging in a production environment an inflexible and cumbersome process.

Debugging optimized code developed on pipelined architectures without hardware interlocking is rather difficult as the pipelines typically have bypass paths that allow instructions to use values before they have flowed through the pipeline. Debuggers rarely have access to these bypass paths making it difficult for a debugger to save and restore the pipeline. This adds complexity to the debugging process.

SUMMARY OF THE INVENTION

A method and system for debugging an executing service on a pipelined CPU architecture are described. In one embodiment, a breakpoint within an executing service is set and a minimum state of the executing service is saved. In addition, a program counter of the executing service is altered. The program counter is restored and the state of the executing service is restored.

BRIEF DESCRIPTION OF THE DRAWINGS

The present invention is illustrated by way of example, and not by way of limitation in the figures of the accompanying drawings in which like reference numerals refer to similar elements.

FIGS. 7–9 are exemplary optimized code fragments;

DETAILED DESCRIPTION

Figure 1:
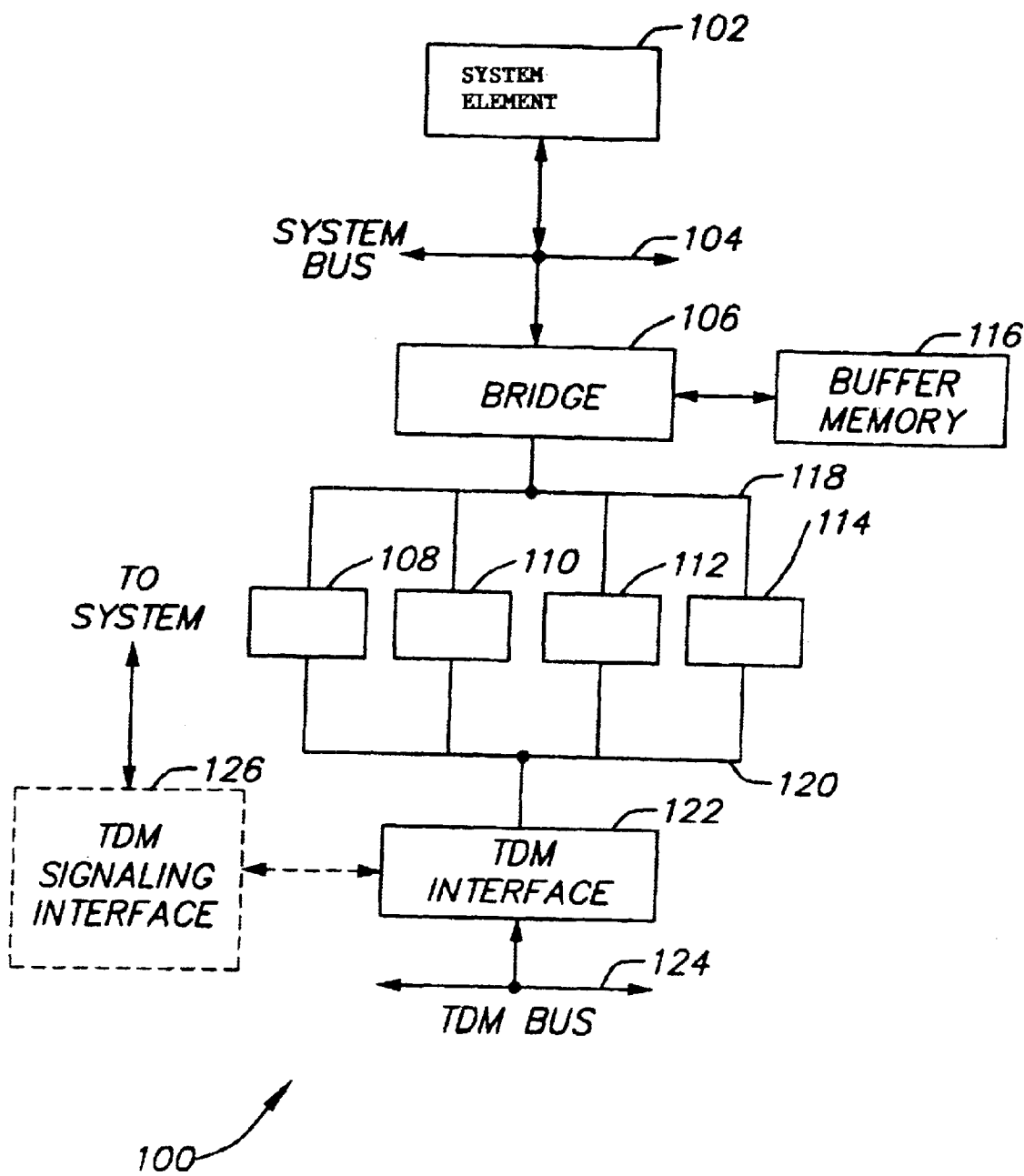
FIG. 1 is a system architecture of one embodiment for a multi-channel, multi-service system.

A method and system for debugging an executing service on a pipelined CPU architecture without hardware interlocks are described. In one embodiment, a breakpoint within an executing service is set and a minimum state of the executing service is saved. In addition, a program counter of the executing service is altered. The program counter is restored and the state of the executing service is restored.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a system architecture of one embodiment for a multi-channel, multi-service system 100. Referring to FIG. 1, system element 102 is connected via system bus 104 and bridge 106 to a plurality of processing chips 108, 110, 112, 114. In addition, bridge 106 is connected to buffer memory 116. System element may be another bridge 106 configuration or other suitable component. Bridge 106 is connected via bus 118 to the processing chips 108–114. In one embodiment, processing chips 108–114 are connected via bus 120 to time division multiplexing (TDM) interface 122. In alternate embodiments, chips 108–114 may be connected to a digital signal 0 (DS0) interface or other applicable interface. In one embodiment, TDM interface 122 is connected to a number of modules and ports installed on the TDM bus 124. In addition, TDM interface 122 may optionally be connected to TDM signaling interface 126.

TDM is a base-band technology in which individual channels of data or voice are interleaved into a single stream of bits (or framed bits) on a communications channel. Each input channel receives an interleave time segment in order that all channels equally share the medium that is used for transmission. If a channel has nothing to send, the slot is still dedicated to the channel and remains empty.

In one embodiment, an operating system running within multi-channel, multi-service system 100 supports telecommunication and data communication applications. These applications involve running multiple channels of protocol stacks built from multiple services. Multi-channel, multi-service system 100 enables the dynamic configuration of services within the embedded telecommunication and data communication environment. In addition, the operating system automatically defines the allocation of resources for the channels within system 100.

Figure 2:
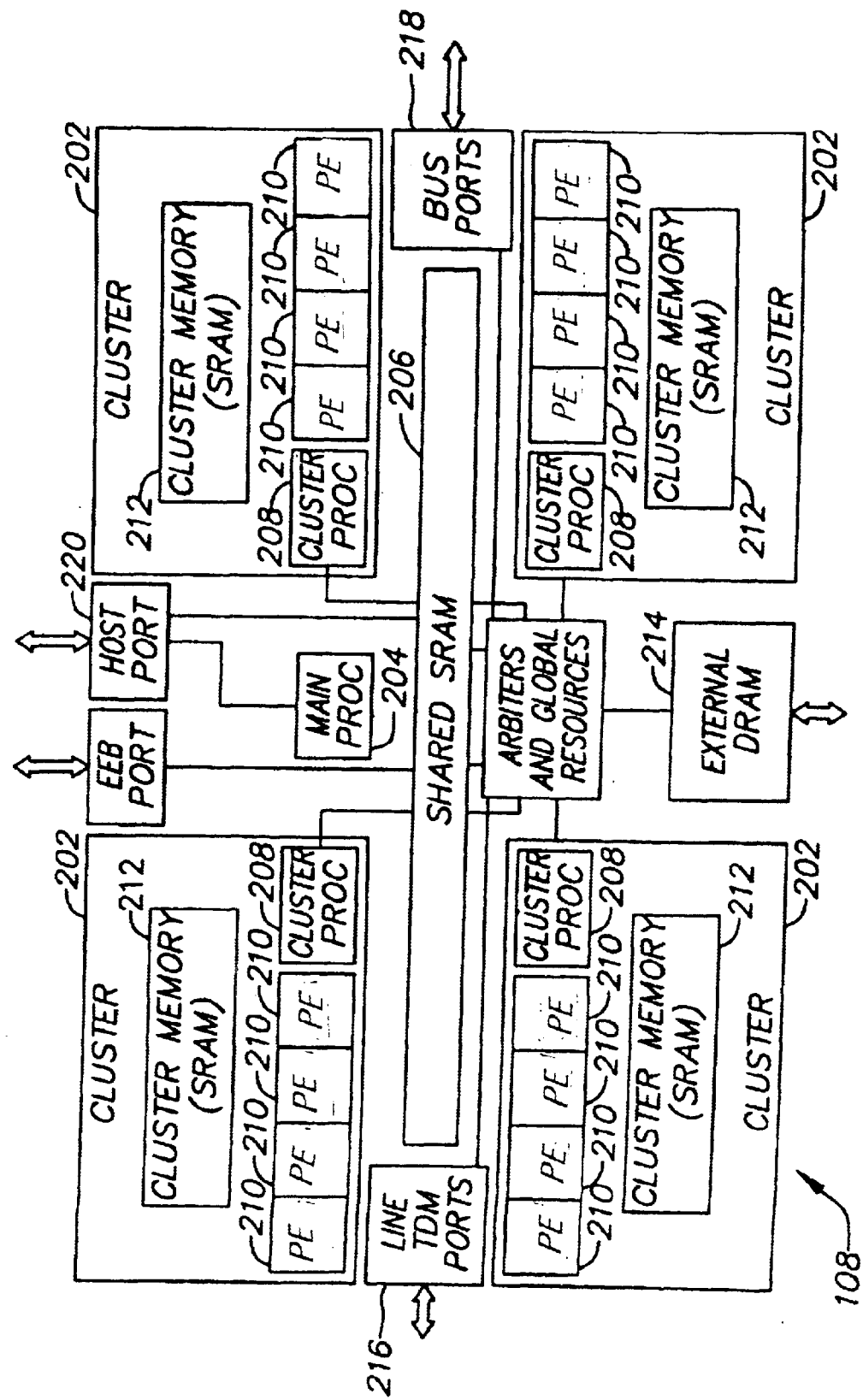
FIG. 2 is a block diagram of one embodiment for a processing chip of FIG. 1.

FIG. 2 is a block diagram of one embodiment for a processing chip 108. Each processing chip 108 contains clusters 202 and main processor 204. Each cluster 202 contains a cluster processor 208 and a number of processing engines (PEs) 210. Main processor 204 is configured to perform all control code and operations including receiving control messages from host 102 and allocating channels to the various clusters 202.

Processing chip 108 also includes a shared static random access memory (shared SRAM) 206. Shared SRAM 206 may be accessed directly by all the cluster processors 202 and main processor 204. An instruction store contained within the PEs 210 can also access shared SRAM 206. Shared SRAM 206 is used for storing operating system and application code as well as hosting the data for code running on main processor 204.

Each cluster 202 contains cluster SRAM 212. Cluster SRAM 212 is responsible for maintaining channel data running on each individual cluster 202. Cluster SRAM 212 includes I/O buffers and programming stacks. The operating system of system 100 uses the hardware to enforce memory protection to prevent a channel from inadvertently corrupting another channel's data or code.

External dynamic random access memory (DRAM) 214 may be used for application data too large to fit on the on-chip cluster SRAM 212 or shared SRAM 206 and may be used as a swap area for application code.

Each processing chip 108 includes two line side ports 216 and two bus ports 218. These ports are used for packet side data and control transport. In addition, host port 220 is used to communicate with the host 102 and is accessible only from main processor 204 and serial boot port 222 that is used to send the boot stream to the chip.

Figure 3:
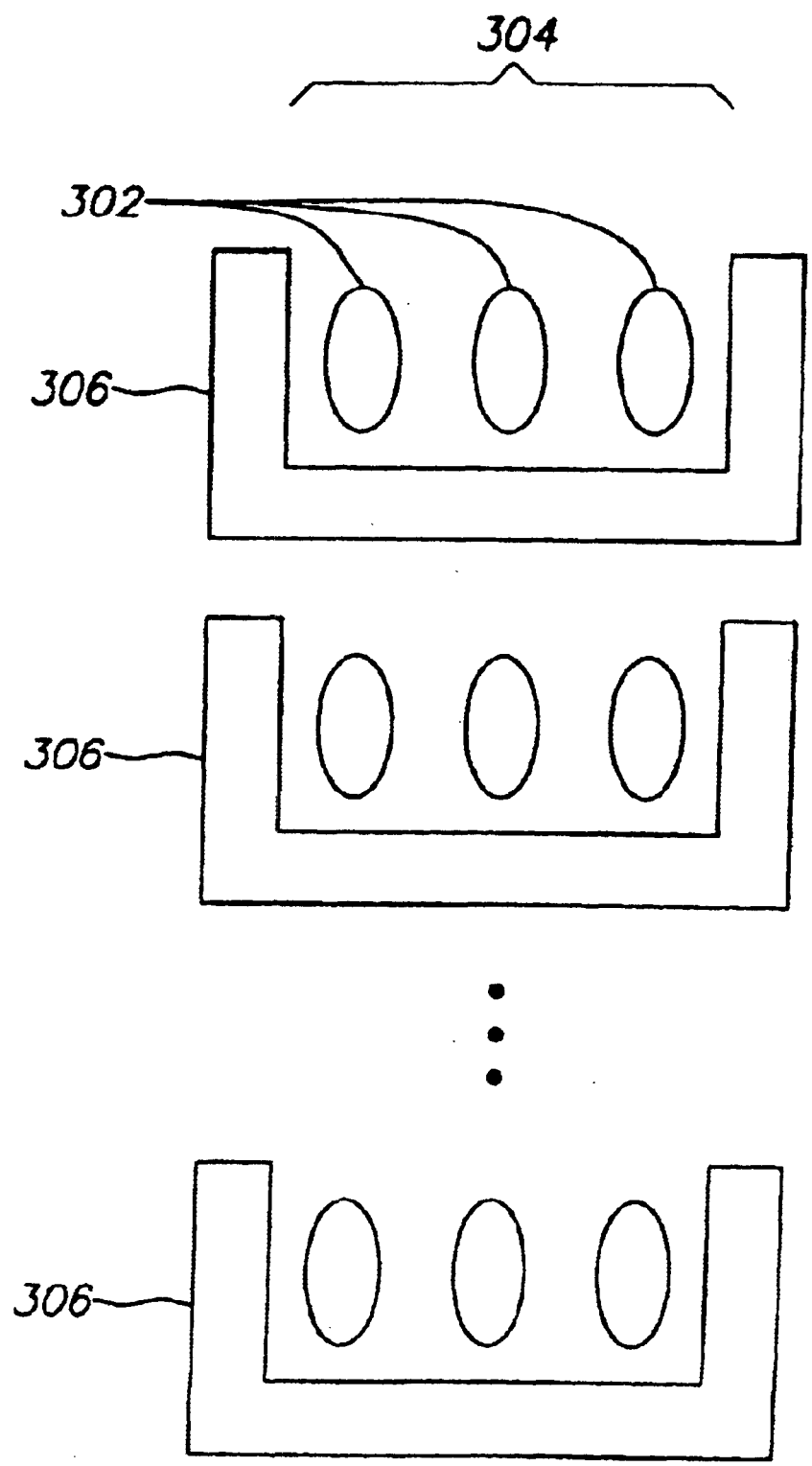
FIG. 3 is a block diagram of one embodiment for multiple sockets/services within a processing chip.

FIG. 3 is a block diagram of another embodiment for a portion of a multi-channel, multi-service system 100. Referring to FIG. 3, service 302 is a self contained set of instructions that has data input/output, control, and a defined interface. Service 302 performs defined processing upon a certain amount and a certain format of data. In addition, service 302 emits a certain amount and a certain format of data. In an alternate embodiment, service 302 may process data in a bi-directional manner. Service stack 304 is a linked set of services 302 that provide a larger processing unit. Service stack 304 is a unique, ordered collection of services 302, such as, for example, echo cancellation services, tone detection services, and voice conferencing services. The services 302 within the service stack 304 are processed in-order.

Socket 306 is a virtual construct that provides a set of services 302 in the form of a service stack 304. The operating system processes services 302 that are encapsulated in socket 306 including connecting the line and/or packet data flow. Processing within socket 306 is data driven. That is, services 302 are invoked by sockets 306 only after the required data has arrived at socket 306. In one embodiment, applications may build protocol stacks by installing a service stack 304 into a socket 306. Services 302, service stacks 304, and sockets 306 are allocated and de-allocated as required by system 100.

Figure 4:
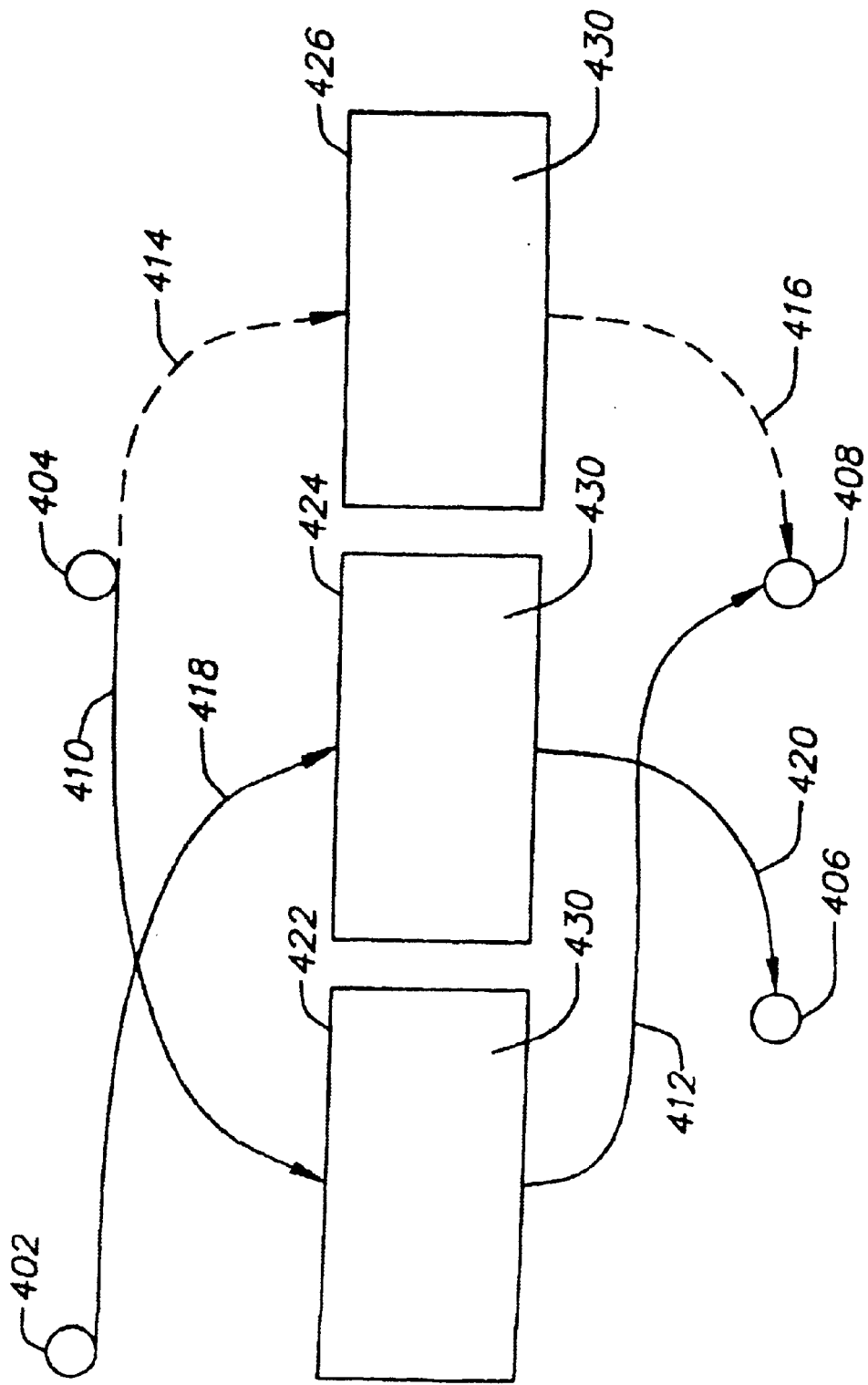
FIG. 4 is an exemplary diagram of channel sockets within the multi-channel, multi-service system of FIG. 1.

FIG. 4 is an exemplary diagram of channel sockets (CSs) 430 (422, 424, 426) within system 100. CSs 430 are specialized sockets 306 that direct the flow of information through the system 100 between two or more devices or end points 402, 404, 406, 408. End points may be, for example, physical devices. CS 430 is a socket 306 that accepts a service stack 304 and processes channel data. CS 430 connects any line side slot or bus channel on one end of CS 430 to any other line side slot or bus channel on the opposite end of CS 430. CS 430 is defined by external, physical interface points and provides the ability to process the service stack 304. Information may flow from a physical end point 402 via connection 418 to CS 424. The information is processed by services 302 within CS 424 and is transferred via connection 420 to end point 406. The operating system may dynamically change the flow of information through different CSs 430 depending upon the needs of the end points 402–408. For example, data may be initially set to flow from end point 404 via connection 410 through CS 422 and via connection 412 to end point 408. However, if service stack 304 within CS 422 is incompatible with the data, CS 422 notifies the operating system to break the flow and redirect the information. The operating system then redirects the flow to an existing CS 430 with the proper service stack 304 or creates a new CS 430. Referring to FIG. 4, the operating system may redirect the flow from end point 404 to end point 408 through connection 414, CS 426, and connection 416. In addition, the operating system may replace the service stack in CS 422 with another stack compatible with the data.

A CS 430 is defined by the external, physical interface end points 402, 404, 406, and 408 and the data flowing through the CS 430. Each end point 402–408 may be different physical devices or the same physical interface or device. CS 422 services may perform a conversion of data. The CS 430 mechanism allows a service stack 304 to be built into the information flow in which services 302 may direct or process the data as it flows through the system. For example, if a first service outputs a 40 byte data frame and a second service uses an 80 byte frame, in one embodiment, the second service waits until the first service outputs enough data in order for the second service to process the data. In an alternate embodiment, the first service delays sending data to the second service until it accumulates enough data. Services 302 are independent modules and are standalone plug-ins. Thus, in one embodiment, services 302 may be dynamically downloaded into shared SRAM 206 in real-time to build CSs 430 as required by the data.

Applications may be written without regard for particular input/output channels or physical interfaces. The operating system is in charge of dynamically allocating and deallocating sockets and connecting input/output components. Thus, the CS 430 mechanism provides single channel programming with multiple channel execution. In addition, an application may be written to provide flow of information between end points 402–408 independent of the type of the operating system and independent of the type of data being processed. CS 430 are independent of both the operating system and the hardware configuration. The mechanism also relieves applications of the management of channels and places the management into the operating system, thus producing channel independent applications. In addition, the CS 430 mechanism allows the applications and services 302 to be platform independent. In one embodiment, the CS 430 mechanism is used in debugging of applications and services. Since services may be loaded dynamically, the user may choose not to have the debugger in the system if there is no need for debugging operations.

Figure 5A:
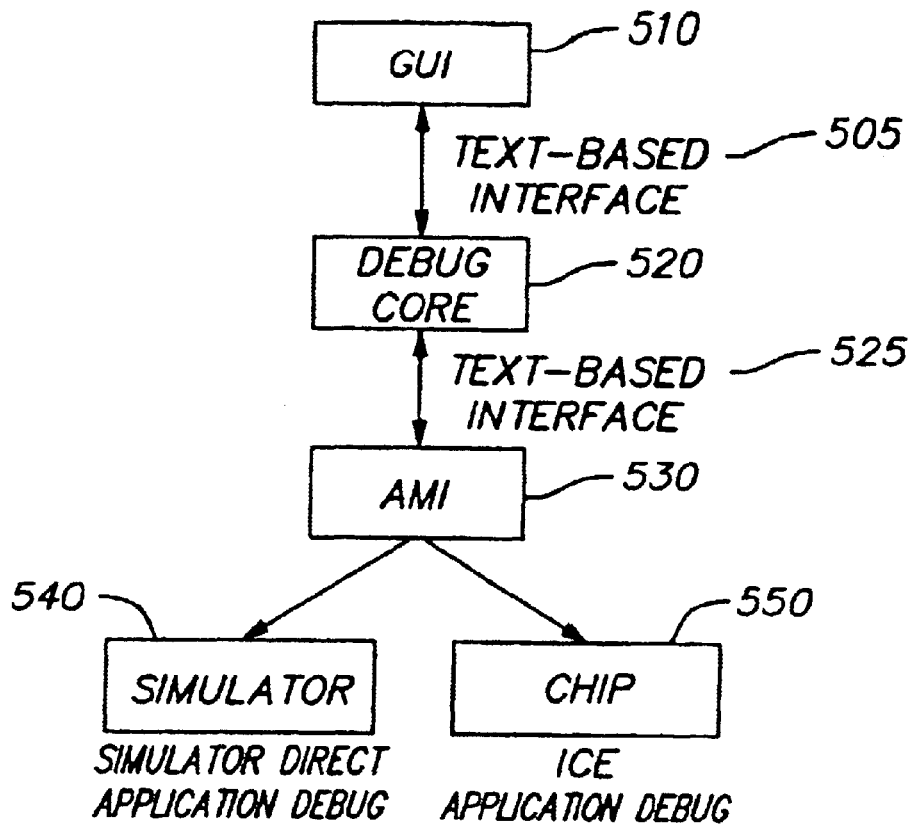
FIG. 5a is a block diagram of one embodiment for an interactive debugging system.

FIG. 5a is a block diagram of one embodiment for an interactive debugging system. Referring to FIG. 5a, debugging system 500 includes debug core 520, graphical user interface (GUI) 510, and abstract machine interface (AMI) 530. Debug core 520 is coupled to GUI 510 via a text-based bi-directional 505. GUI 510 provides an application developer with a simple and convenient way of debugging an application or a service. The tools provided by GUI 510 may include, for example, top-level menus, context menus, windows, dialog boxes, and setting of user preferences. Text-based interface 505 provides two-way communication between debug core 520 and GUI 510. In one embodiment, GUI 510 may receive a command from the application developer and send it to debug core 520 using text-based interface 505. Debug core 520, in turn, may send data to GUI 510 using text-based interface 505. GUI 510 may then display this data to the application developer in various ways. For example, debug core 520 may pass information about currently running sockets and services to GUI 510. GUI may then display this information, allow the application developer to select a socket or service for debugging, and transfer data identifying the selected socket or service back to debug core 520.

Debug core 520 is coupled to AMI 530 via text-based bi-directional interface 525. AMI 530 directly communicates with chip 550 or simulator 540. Chip 550 represents processing chips 108–114. Simulator 540 may be used to perform diagnostics of an application or a service in a simulated environment. Simulator 540 allows loading and running an application as if it were running on the chip itself. All the features and capabilities inherent in chip 550 are available through simulator 540.

In one embodiment, AMI 530 provides an abstract view of multi-channel, multi-service system 100 at the hardware and operating system level. AMI 530 may work with a single target chip or simulator at a time and may view the target chip or simulator as a single entity. AMI 530 allows debug core 520 to provide an isolated debugging environment for each socket or service. For example, debug core 520 may maintain a separate context (e.g., breakpoints, watchpoints, and variable displays) for each socket or service. In one embodiment, debug core 520 uses AMI 530 to provide an application developer with the ability to control all possible debugging and diagnostic activity on a target socket or service.

Text-based interface 525 enables a two-way communication between debug core 520 and AMI 530. The use of text-based interface 525 simplifies the development process by designing debug core 520 and AMI 530 as independent modules. In addition, text-based interface 525 allows running debug core 520 and AMI 530 as stand alone applications. Text-based interface 525 may also improve the quality assurance (QA) process by providing a QA user with the ability to enter the command and get the response back in an automated environment.

In one embodiment, debugging system 500 may operate in various modes. For example, a simulator direct mode (Simulator Direct) allows debug core 520 to communicate with simulator 540 using AMI 530. This mode may provide significant visibility into the PEs 210 and the state of the system 108, but may not be aware of sockets and other high-level operating system constructs. Simulator Direct provides full control over the simulator. Hence, debug core 520 may obtain all performance analysis results that are supported by the simulator. In one embodiment, AMI 530 may analyze the run-time state of system 108 to determine information about sockets and services directly from the data structures of the operating system.

Debugging system 500 may also operate in an in-circuit emulator mode (ICE). ICE allows debug core 520 to communicate with chip 550 through AMI 530 using an access interface of chip 550 such as, for example, the Joint Test Access Group (JTAG) interface. ICE supports debugging of the operating system by controlling the cluster processors 208. ICE does not provide access to PEs 210 and is not capable of controlling or accessing sockets.

Another exemplary mode is an application debug mode (Application Debug). Application Debug may work with either simulator 540 or chip 550. Application Debug relies on the assistance of the operating system to provide access to system resources (e.g., PEs 210 and cluster processors 208). Application Debug is capable of controlling and accessing sockets and allows debug core 520 to maintain information about running sockets and services. Debug core 520 may communicate the information to GUI 510. GUI 510 may then present this information to the application developer for selecting a target construct on which to perform debugging operations. It will be recognized by one skilled in the art that the modes described above are merely exemplary and that a wide variety of modes other than those discussed above may be used by debugging system 500 without loss of generality.

Figure 5B:
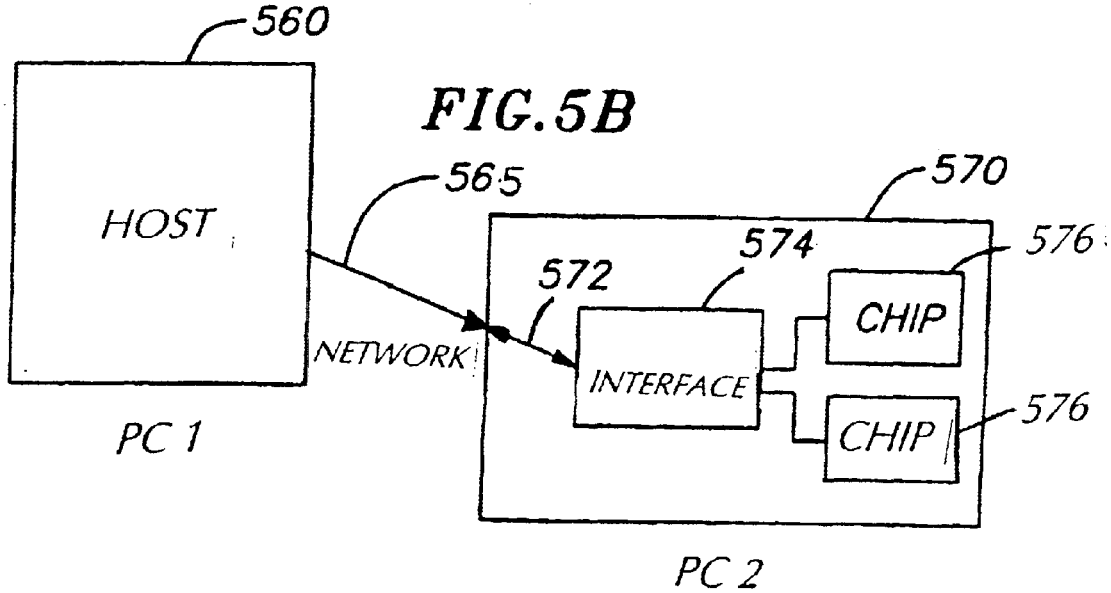
FIG. 5b is a block diagram of one embodiment for an interactive debugging system operating over a network.

FIG. 5*b* is a block diagram of one embodiment for an interactive debugging system operating over a network. Referring to FIG. 5*b*, host computer system 560 includes a debugger which communicates with computer system 570 over a network connection 565. In one embodiment, host 560 contains debug core 520 and GUI 510. Network connection 565 may include, for example, a local area network and a wide area network. Computer system 570 includes chips 576 which communicate over bus 572 via interface 574 with host 560. In one embodiment, bus 572 is a peripheral component interconnect (PCI) bus with host 560. In alternate embodiments, bus 572 may be an industry standard architecture (ISA) bus, a VESA local bus, or a micro channel architecture (MCA) bus. Interface 574 enables communication between chips 576 and bus 572. In one embodiment, the debugger may operate in ICE debugging mode. In this embodiment, interface 574 communicates commands from host 560 to cluster processors of chips 576 and then communicates the resulting data from chips 576 to host 560.

Alternatively, the debugger may operate in Application Debug mode. In Application Debug mode, a debugging request from host 560 is sent over network 565 to computer system 570. Interface 574 communicates the request directly to chip 576. The operating system on chip 576 interprets the request into commands (e.g., set breakpoints or watchpoints, stop the execution, read memory, get status, or display a variable), performs these commands, and generates an appropriate response. The response is then transferred back to host 560 over network connection 565. Network connection 565 may be packet-based (e.g. TCP/IP), cell-based (e.g. ATM) or serial based (e.g. SpiceBus or Utopia). In one embodiment, in a multi-channel, multi-service environment, the operating system on chip 576 may transfer information about running services to host 560 over network connection 565 and allow the debugger on host 560 to operate on an individual service or on a set of services.

Figure 6:
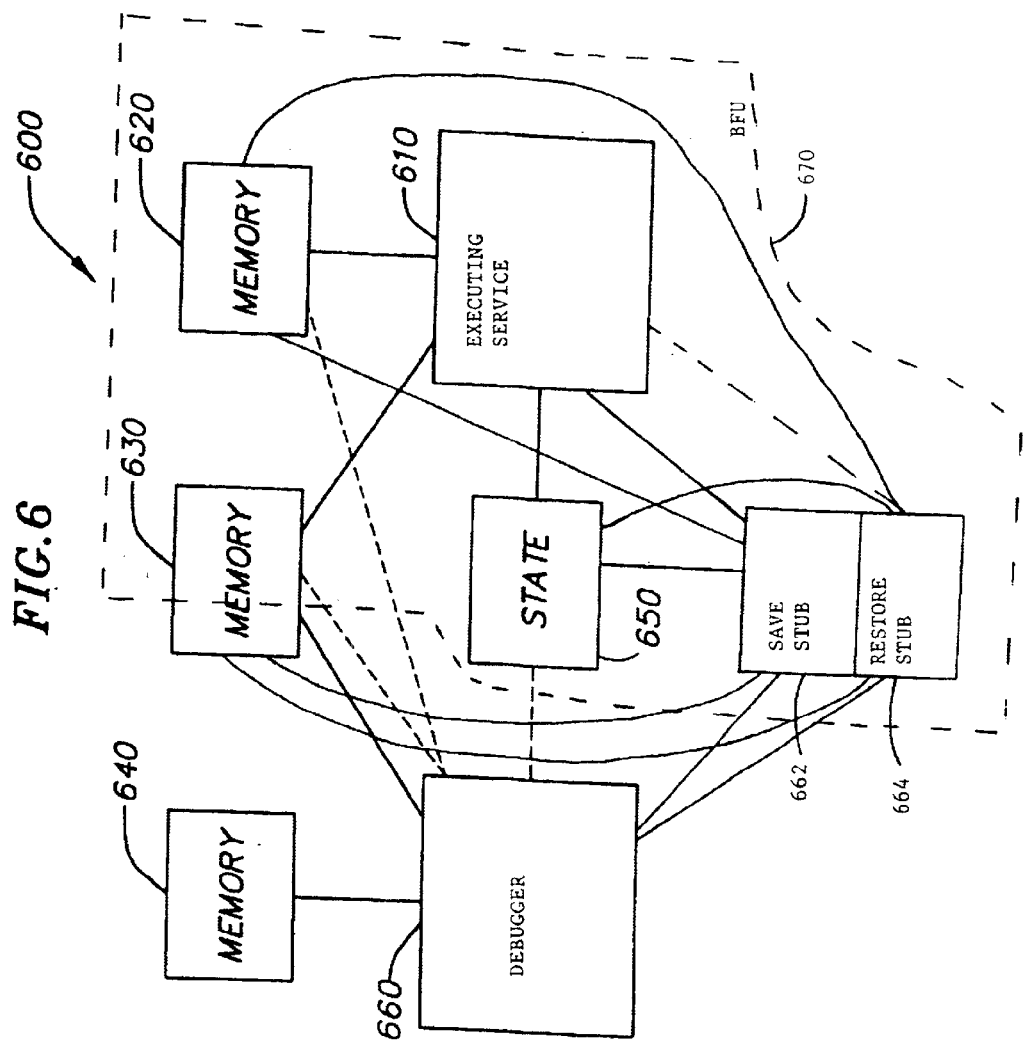
FIG. 6 is a block diagram of another embodiment for a multi-channel, multi-service system.

FIG. 6 is a block diagram of another embodiment for a multi-channel, multi-service debugging system 600. Referring to FIG. 6, system 600 may have a number of processing elements (or constructs) (610) running within a cluster 202. In one embodiment, executing service 610 may run a real time application and debugger 660 may run a control task or an operating system task. A number of executing services 610 may be running within basic functional unit (PE) 670. PE 670 includes save stub 662 and restore stub 664. Save stub 662 is an executable program written to save the minimum state of construct 610. Restore stub 664 restores the minimum state from memory 620. The minimum PE state (MPES) is a minimum amount of executing service 610 state registers which are saved and restored in order to halt service 610 execution and restart it again without altering the functional behavior of service 610. Debugger 660 runs on a processor other than the PE 670. Debugger 660 interacts with save stub 662 and restore stub 664 to read and/or modify service 610 state information and control service 610 execution.

In one embodiment, executing service 610 has independent local memory 620 and debugger 660 has independent local memory 640. In one embodiment, executing service 610 and debugger 660 may have shared memory 630, in which separate portions of memory 630 may be assigned to executing service 610 and debugger 660, respectively. Within system 600, executing service 610 has a state 650 which contains the information for running service 610. In one embodiment, debugger 660 may have the capability of accessing data related to the operation of service 610. In addition, save stub 662 and restore stub 664 access, save, and restore certain information from state 650 during a breakpoint operation. Debugger 660 may communicate with host 102, or host 560 over a network, and perform the commands received from host 102 or 560 in order to effectuate a breakpoint or watchpoint.

In one embodiment, debugger 660 may access the data related to the operation of executing service 610 without affecting the real time environment of executing service 610. For example, debugger 660 may be able to look at ("snoop" on) local memory 620, state 650, and the portion of shared memory 630 which is assigned to executing service 610. In addition, debug 660 may directly access the following state information of construct 610 without altering the state of construct 610: program counter, next program counter, PC delay slot enable signal, page numbers, tags, valid bit, fetch bit, and LRU information, memory contents, breakpoint and/or watchpoint registers and enable bits, construct 610 status, configuration contents, address unit configuration contents that may not be read by instructions, and two performance registers and their control values.

In one embodiment, the debugging process may directly intercede with the real time environment of executing service 610. Debugger 660 may, for example, modify state 650 to set a breakpoint register or a watchpoint register, request a notification when target construct 610 hits a breakpoint, and stop the operation of executing service 610. Subsequently, debugger 660 may restart the operation of executing service 610 upon receiving a command from host 102 or 560.

FIGS. 7–9 are exemplary optimized code fragments executed by services 306 within system 100. Referring to FIG. 7, instructions 1, 2, and 3 are load from main memory instructions. Within system 100, these load from memory instructions require multiple pipeline cycles to complete from the time they are initially executed until the data is available in the register. Thus, line 1 is executed and requires a certain amount of pipeline cycles in order for the value loaded into register 3 to be available. In one embodiment, main memory loads require three delay slots (pipeline cycles) between the load instruction and an instruction that uses the returned value. Thus, the load of register 3 in line 1 is not available at line 4 for the add of registers 3 and 4 into register 6. Line 4 uses the old values of registers 3 and 4 (those values that existed as a result of operations executed prior to line 1) to add into register. In one embodiment, an instruction at line 5 could use the value returned from memory as a result of the load instruction at line 1. The pipeline may be designed such that the instruction at line 5 receives the "new" value of register 3 via a bypass path before register 3 is actually written in the register file. A debugger may not have visibility of the bypass, thus, making it difficult to ascertain the value of register 3 at line 5.

Referring to FIG. 8, a typical code fragment of optimized code is shown in which values in memory pointed to by register 1 are loaded into register 3 in lines 1–4. In lines 5–8, the resulting register 3 values are stored back into the memory locations pointed to by register 1. In this code fragment, the value loaded in line 1 is available for the store operation at line 5; the load operation of line 2 is available for the store operation of line 6; the load operation of line 3 is available for the store operation of line 7; and the load operation of line 4 is available for the store operation of line 8. As noted above, these "new" values of register 3 may be available via bypass paths buried within the CPU microarchitecture, thus, making an external debugger difficult as it can not determine the value of register 3 until it is written into the "debugger visible" register file.

FIG. 9 is another exemplary optimized code fragment. In the multi-channel, multi-service system 100, if a breakpoint is inserted at line 5, the debugger 660 needs to store the old values of registers 5 and 6 that existed prior to the executions of lines 3 and 4. After a breakpoint is initiated, PE 670 flushes or clears all information in the pipeline. The old values in registers in transition need to be saved in order to recreate the pipeline after control is returned to PE 670. These old values are needed to reinitialize the pipeline in order for the service executing the code of FIG. 9 to properly add the correct values of registers 5 and 6 into register 7. The breakpoint mechanism will be described below. Registers 5 and 6 are termed unstable registers and line 5 is termed an unstable register point. An unstable register point is a point in a code fragment where service 610 instruction is using a register which is in the process of changing, but the new register value will not be available until one or more cycles later. Debugger 660 reads the scalar registers (registers 5 and 6) and creates a pipeline restore array in the MPES prior to calling save stub 662. When debugger 660 is ready to reinitialize service 610 after debug operations have been executed, debugger 660 swaps the old values of registers with the new values stored in the MPES. After execution of restore stub 664, the pipeline restore array is filled with the new values of unstable registers and then a series of stack "pop" operations are executed to refill the pipeline. After execution of the four "pop" operations, service 610 continues normal operation. The pipeline restore array is a 16 byte array in the MPES. In one embodiment, the pipeline restore array contains the three potentially unstable scalar registers followed by the value of the stack pointer at the time of the breakpoint.

Figure 10:
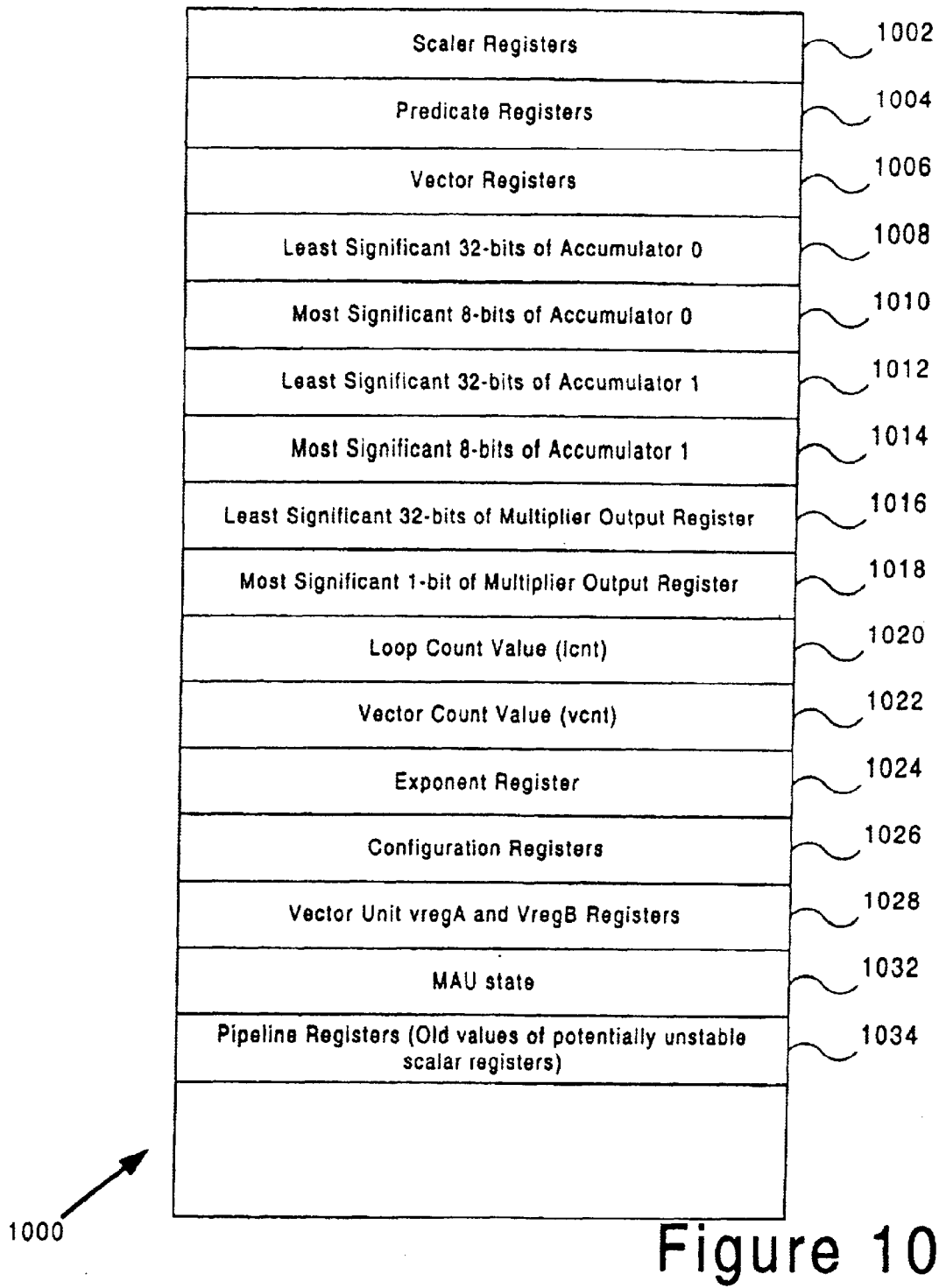
FIG. 10 is a block diagram of one embodiment for a minimum buffer basic functional unit state of the system of FIG. 1.

FIG. 10 is a block diagram of one embodiment for a minimum buffer PE state (MPES) 1000. MPES 1000 is the minimum amount of information saved and restored by debugger 660 to allow service 610 to continue execution following a breakpoint, without affecting the functional behavior of the code executing on service 610. Breakpoints are implemented in a manner that they do not negatively affect program behavior except for real-time timing issues.

MPES 1000 is stored in a cluster memory location accessible to the service and the OS. Referring to FIG. 10, MPES 1000 includes scalar registers 1002, predicate registers 1004, vector registers 1006, least significant 32 bits of accumulator 0 (1008), most significant eight bits of accumulator 0 (1010), least significant 32 bits of accumulator 1 (1012), most significant eight bits of accumulator 1 (1014), least significant 32 bits of multiplier output register 1016, most significant one bit of multiplier output register 1018, loop count value 1020, vector count value 1022, exponent register 1024, configuration registers 1026, vector unit VREG A and VREG B registers 1028, VA0 through VA3 states 1030, MAU state 1032, and old values of pipeline registers 1034 (potentially unstable scalar registers).

Save stub 662 is responsible for saving vector registers 1006, the least and most significant bits of accumulator 0 and accumulator 1 (1008–1014), the least significant and most significant bits of multiplier output register (1016, 1018), loop count value 1020, vector count value 1022, exponent register 1024, vector unit VREG A and VREG B registers 1028, VA0–VA3 state 1030, and MAU state 1032. Debugger 660 is responsible for saving scalar registers 1002, predicate registers 1004, configuration registers 1026, and pipeline registers 1034. Debugger 660 is also responsible for restoring pipeline registers 1034. Restore stub 664 restores MPES 1000, but leaves the stack pointer pointing to the pipeline registers array. Debugger 660 single steps (executes) four instructions which "pop" the pipeline registers off the stack in four cycles. After these four instructions have been executed, target 610 stack pointer will point to the desired location. If debugger 660 is not performing a debugger 660 invoke function call, the stack pointer will be equal to the value that it contained at the time of the breakpoint.

Service 610 cannot save the old state of the scalar register 1002 and the predicate register 1004 in a single cycle. Thus, debugger 660 must save either (or both) the predicate registers 1004 or the scalar registers 1002. In one embodiment, predicate registers 1004 and scalar registers 1002 are saved by debugger 660. In one embodiment, debugger 660 saves the configuration registers 1026 as target 610 has no instruction capable of saving its own configuration registers 1026.

Debugger 660 saves pipeline registers 1034 as only debugger 660 knows what set of three potentially unstable registers must be saved for a given breakpoint. Target 610 does not know which three potentially unstable registers are in transition. Save stub 662, in one embodiment, may be written to handle all possible permutations of these three unstable register loads.

Figure 11:
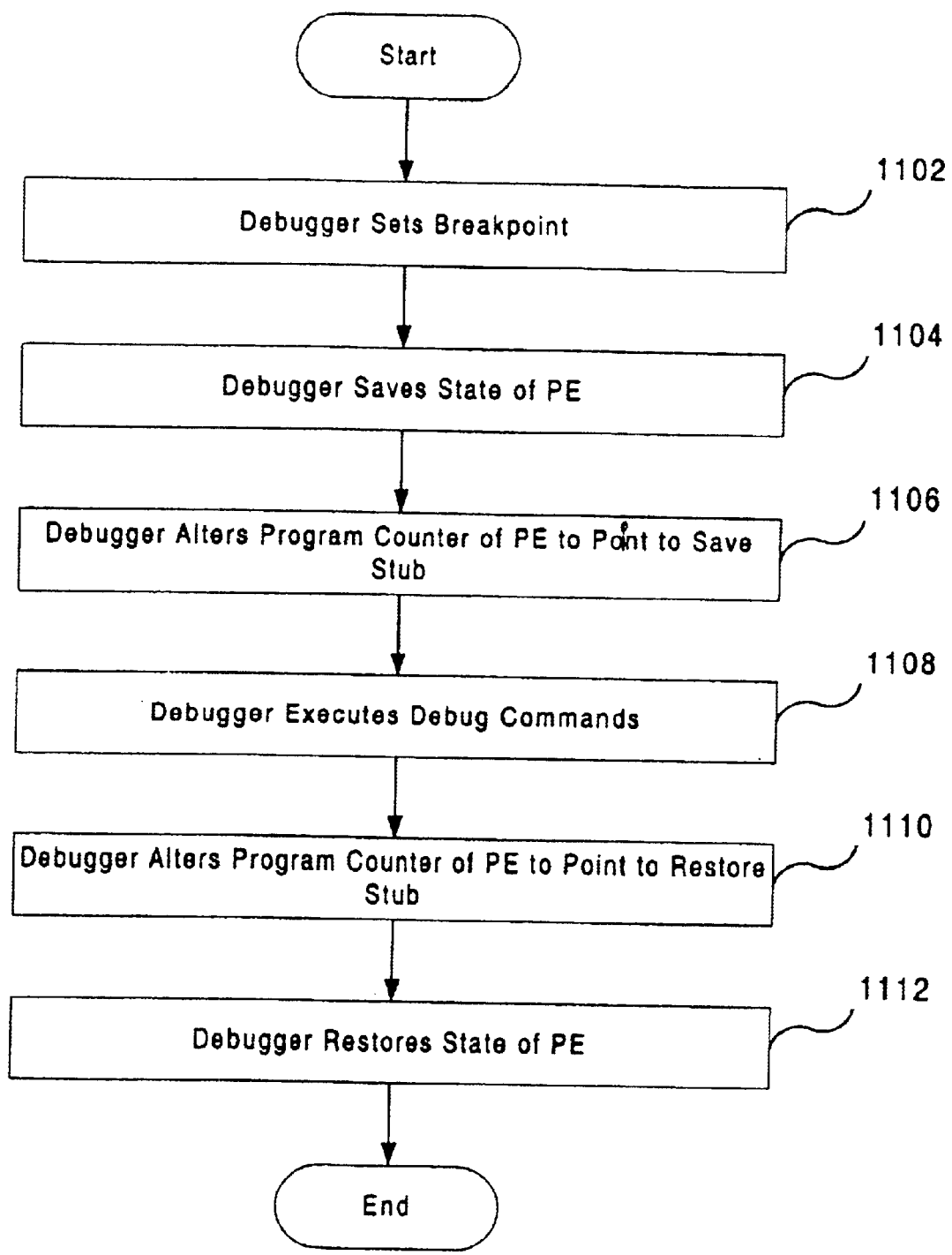
FIG. 11 is a flow diagram of one embodiment for debugging optimized code.

FIG. 11 is a flow diagram of one embodiment for debugging optimized code. Initially at processing block 1102 debugger 660 sets a breakpoint within executing service 670. Debugger 660 locates an instruction to insert the breakpoint and sets the breakpoint at the location. In one embodiment, debugger 660 starts the PE and waits for the PE to halt at the breakpoint location. After the PE reaches a breakpoint, debugger 660 waits for the PE memory fetches and configuration loads to complete. Debugger 660 then removes the breakpoint from executing service 610.

At processing block 1104, debugger 660 saves the state of PE 670. Debugger 660 saves PE's 670 scalar registers, predicate registers, and configuration registers. In one embodiment, debugger 660 determines if any of the scalar registers are in transition. When a breakpoint occurs, there may be several scalar register write-backs in the pipeline waiting to be executed or to finish execution. Debugger 660 cannot access the pipeline but must flush the pipeline, reading the scalar registers after each cycle. In one embodiment, there may be up to three unstable scalar registers in the pipeline at any time.

In one embodiment, there is a three cycle load delay for scalar registers. However, in this embodiment, an additional two cycle latency is also required in order to complete the flush of the pipeline. In one embodiment, debugger 660 single steps two PE 670 instructions before it may safely read the "old value" of the unstable registers. Debugger 660 saves the values contained within the unstable registers and performs a series of no-op instructions to flush the pipeline. Thus, in this embodiment, a total of five instructions are required to flush the pipeline and store the register values.

Debugger 660 may record any predicate changes following each first no-op. Debugger 660 records up to three scalar register changes following the third, fourth and fifth no-ops.

If the breakpoint occurred on an instruction that uses old values of scalar registers (uses values of registers as they existed before the values were changed with instructions still in the pipeline), debugger 660 executes a sequence of instructions which will record the old values of these registers. In one embodiment, two registers may be in transition at any point. Debugger 660 places the correct values of these scalar registers into the MPES before calling the restore step below. In one embodiment, debugger 660 executes four instructions to record the values of these scalar registers which includes two no-op instructions. In one embodiment, only two scalar registers that depend upon old values may be within the pipeline at any time. After the four instructions are executed, the original values of the two scalar registers are saved in debugger 660 registers. Debugger 660 uses these values to restore the pipeline after debug operations are completed.

At processing block 1106, debugger 660 alters the program counter of the PE to point to save stub 662. Debugger waits for PE 670 to execute the breakpoint instruction. After PE 670 executes the breakpoint instruction, debugger 660 stores the saved configuration registers 1026 into MPES stack frame 1000. In one embodiment, debugger 660 factors the 33-bit memory register field in the MPES frame 1000 into a pair of 16-bit numbers and stores them into multiplier output register field 1016 and 1018. Debugger 660 determines the correct value of all 16 scalar registers and stores their state into scalar registers 1002. These values are what is expected by the very first service instruction to be executed after control returns to service 610. In most cases, this will be the instruction on which the breakpoint was originally set.

Registers to be loaded into the pipeline before returning to the service are stored in the MPES 1060. The values stored are the "new values" of the unstable registers which were retrieved from the MPES and saved in the previous processing block. The three registers must be stored in the correct order to recreate the pipeline properly. Debugger 660 stores the value of the stack pointer at the time of the breakpoint within MPES. This value will allow the initial stack pointer to be restored properly after refilling the pipeline.

At processing block 1108, debugger 660 optionally executes debug commands and optionally changes one or more items in the MPES. Alternatively, MPES 1000 information may be transferred to host 560 for display. Items changed may be, for example, scalar registers, vector registers, or the like. The debug commands are issued from debugger 660.

At processing block 1110, debugger alters the program counter of PE 670 to point to the restore stub of debugger 660. Debugger 660 begins PE 670 execution and waits for the PE to execute the breakpoint instruction.

At processing block 1112, the debugger restores state 650 to the original state. Debugger 660 processes restore stub 664 to restore the state of PE 670. Restore stub 664 restores everything in the MPES except for the pipeline registers.

If the breakpoint originally occurred in an instruction that does not make use of old values of scalar registers, the host debugger must single step through instructions to restore values of the three possibly unstable scalar registers. After these registers have been restored, the original pipeline at the time of the breakpoint for these possibly unstable registers will have been recreated and a stack pointer at the time of the breakpoint will have been restored.

If the breakpoint occurred on an instruction that does make use of old values of scalar registers, debugger 660 restores these scalar registers, stores the original values of the remaining scalar registers into the MPES pipeline registers and loads the pipeline from the stored registers.

After the pipeline has been restored, debugger 660 alters the PE's program counter to point to the original breakpoint location and starts PE 670 execution.

Figure 12:
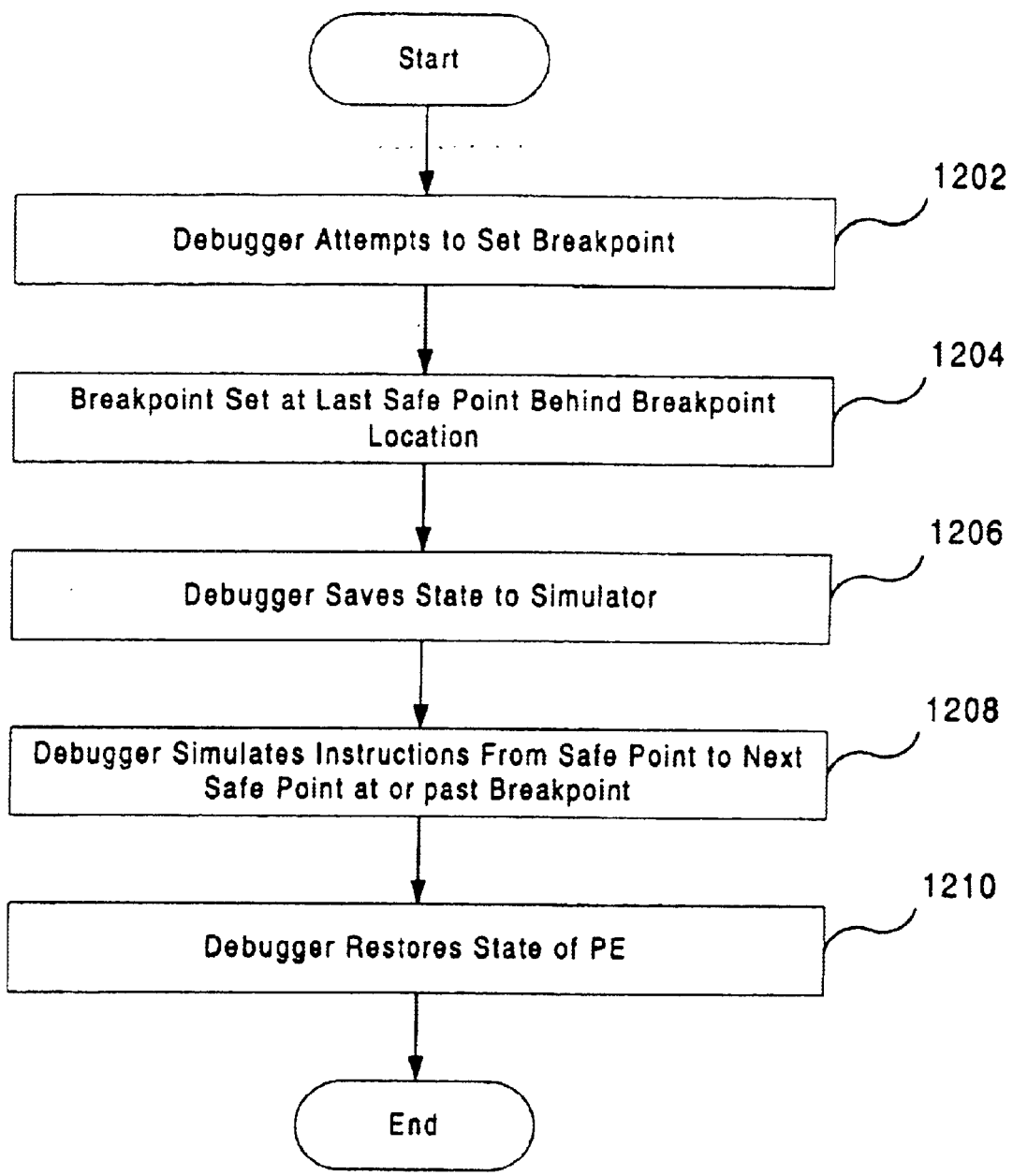
FIG. 12 is a flow diagram of one embodiment for debugging optimized code using safe points.

FIG. 12 is a flow diagram of one embodiment for debugging optimized code using safe points. Initially a processing block 1202, debugger 660 attempts to set a breakpoint. If the debugger attempts to set the breakpoint at an unsafe location, in one embodiment, the debugger does not allow the breakpoint to be set at the unsafe location, but rather attempts to find the nearest safe location (prior to the desired location) to set the breakpoint. Referring to FIG. 9, if a breakpoint is attempted to be set at line 5, debugger 660 will search back within the code to a point in which registers are not in transition within the pipeline. In the example of FIG. 9, this safe point would be prior to line 3 as line 5 uses the "old values" of registers 5 and 6 in the addition.

At processing block 1204, debugger 660 locates the previous safe point within the instructions and sets the breakpoint at that location. Unsafe breakpoint locations are points in the instruction set where the host debugger must disallow breakpoints. After debugger 660 sets the breakpoint at a safe location, debugger 660 starts PE 670 and waits for PE 670 to execute the breakpoint instruction.

At processing block 1206, the debugger saves the state of the PE to a simulator. In one embodiment, the simulator is on a remote host. In one embodiment, the debugger saves PE registers and other state information in order to restore the PE to its state after debugging has occurred. Values saved are similar to those described in reference to FIG. 11 above.

At processing block 1208, debugger 660 simulates the instructions from the safe point found at processing block 1204 to the next safe point past the breakpoint in the instruction code. In addition, the debugger may insert commands to debug the code as described above. Once debugger 660 has executed the code in the simulation, debugger 660 returns control to PE 670.

At processing block 1210, the debugger stores the simulated state to state 650. Operations are similar to those described in reference to FIG. 11. After the debugger stores state 650, debugger 660 starts PE 670 execution at the breakpoint instruction.

Figure 13:
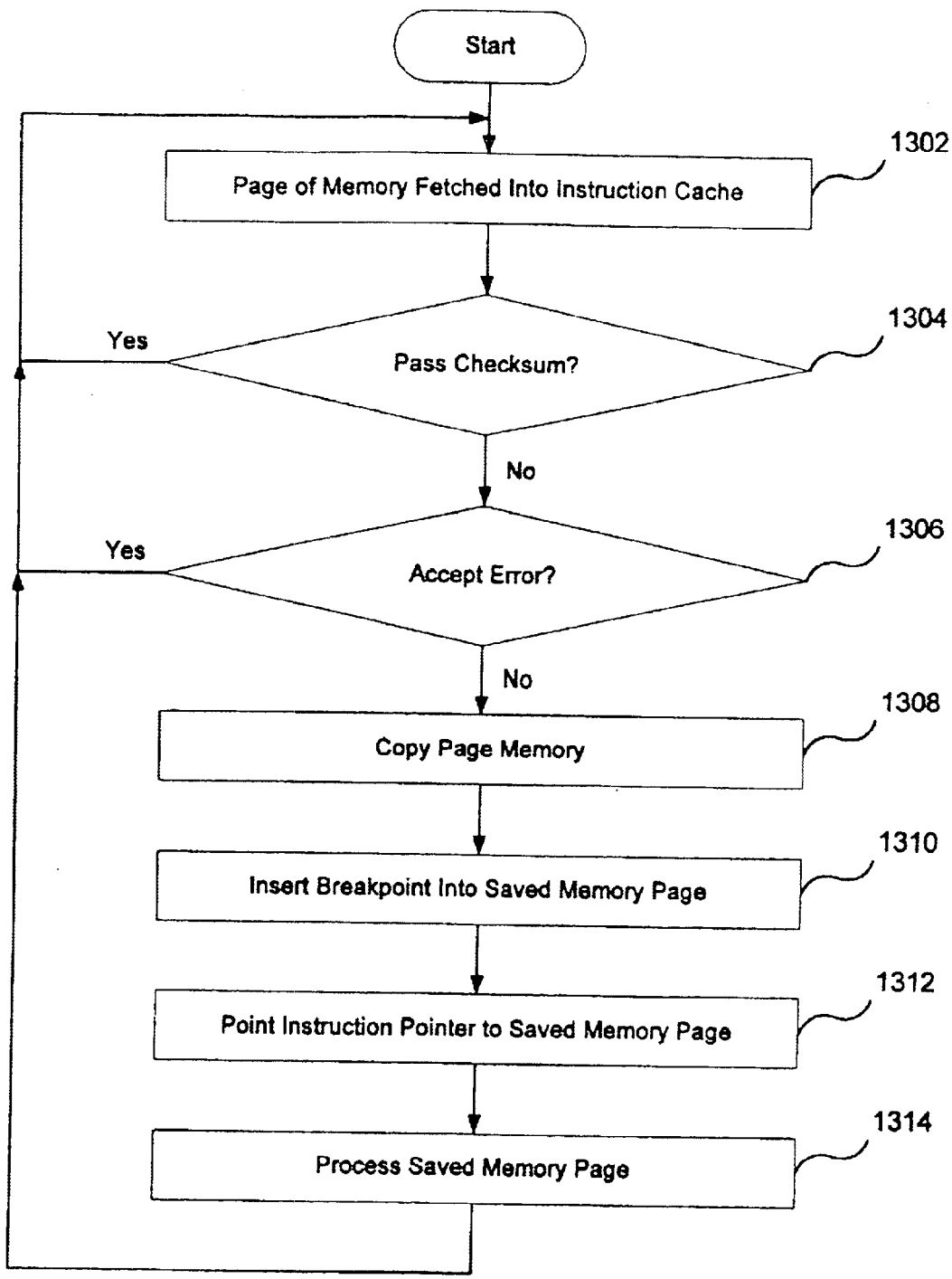
FIG. 13 is a flow diagram of one embodiment for processing breakpoints in a multi-channel, multi-service environment.

FIG. 13 is a flow diagram of one embodiment for processing breakpoints in a multi-channel, multi-service environment. Initially at processing block 1302, PE 670 fetches a page of instruction code into memory 620 for execution. In a multi-channel, multi-service environment, multiple PEs may be executing the same set of instruction code for a given service 306. Within system 100, only one program memory exists for a given service 306. Each PE fetches a memory page into its own cache for processing. Thus, any breakpoint inserted into the instruction code will be executed by all PEs. In order to execute breakpoints for only a given PE, each PE performs a checksum for a fetched memory page as it is being fetched.

At processing block 1304, after PE 670 checks the page of memory for its checksum, it is determined whether the checksum has passed or failed. If the checksum test has passed, PE 670 continues execution of the page of memory and eventually returns to processing block 1302 for fetching a next page of memory. However, if the checksum test fails, execution continues at processing block 1306.

At processing block 1306, it is determined whether PE 670 is to accept or reject the checksum error. Host debugger 660 may send commands to individual PEs to ignore checksum errors. If PE 670 has received a command to ignore checksum errors, processing continues at processing block 1302. However, if PE 670 has received a command to reject checksum errors, processing continues at processing 1308.

At processing block 1308, debugger 660 copies the page of memory from the PE cache into a separate cache area. The separate cache area may be within debugger 660 or within PE 670.

At processing block 1310, debugger 660 inserts the breakpoint into the saved memory page. Debugger 660 alters the program counter of PE 670 to point to the saved memory page and initiates execution of the PE within the saved memory at processing block 1312.

At processing block 1314, debugger 660 begins the processing of the saved memory page. The processing of the saved memory is as in steps 1104 through 1112 of FIG. 11. After PE 670 executes the altered page of memory, PE 670 will load a new page of memory at processing block 1302 and continue processing.

Within the processing of multi-channel, multi-service environment, debugger 660 will process the breakpoint of all services running on a single processor. In an alternate embodiment, only one service will be running on a PE at any particular time.

Several variations in the implementation of the method for interactive debugging have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method of debugging an executing service on a pipelined CPU architecture, the method comprising:

setting a breakpoint within an executing service;

saving a minimum state of the executing service;

setting a program counter of the executing service to point to a save stub;

setting the program counter of the executing service to point to a restore stub;

restoring the state of the executing service;

determining if registers are unstable;

if registers are unstable, saving the value of any registers that change after each pipeline cycle; and if the breakpoint location is set on a location that uses old values of registers, saving the old values of the registers before new values are written to the registers.

2. The method of claim 1 further comprising:

executing debug commands within the executing service.

3. The method of claim 1 wherein setting the breakpoint further comprises:

locating an original instruction within the executing service to set the breakpoint;

inserting a breakpoint instruction at the breakpoint;

starting the executing service;

waiting for the breakpoint to execute;

waiting for memory fetches and configuration loads to complete; and restoring the original instruction at the breakpoint location.

4. The method of claim 1 wherein setting the breakpoint comprises:

altering an instruction within the executing service at a breakpoint location; and invalidating a page cache of the executing service.

5. The method of claim 1 wherein setting the breakpoint comprises:

setting a breakpoint register to point to a breakpoint location.

6. The method of claim 1 wherein saving a minimum state comprises:

saving the executing service registers.

7. The method of claim 1 wherein registers are scalar registers or predicate registers.

8. The method of claim 1 wherein setting the program counter of the executing service to point to a save stub further comprises:

starting execution of the executing service;

executing the breakpoint;

storing configuration registers of the executing service;

saving values of scalar and predicate registers;

saving pipeline registers; and storing a stack pointer value for a breakpoint location.

9. The method of claim 1 restoring the program counter further comprising:

starting the executing service at the breakpoint.

10. The method of claim 1 wherein restoring the state further comprises:

if a breakpoint location is on an instruction that does not make use of old values, restoring stable registers;

if the breakpoint location is on an instruction that does make use of old values, restoring unstable registers, and reloading the pipeline;

altering the program counter of the executing service to point to the breakpoint location; and starting execution of the executing service at the breakpoint location.

11. The method of claim 1 further comprising:
fetching a page of memory of the executing service into an instruction cache;
checking for a checksum error within the page of memory; and
if the executing service is set to reject the checksum error,
saving the page of memory,
inserting a breakpoint into the saved page of memory,
altering an instruction pointer to the saved page of memory, and
processing the saved page of memory.

12. The method of claim 1, wherein saving the minimum state further comprises saving a minimum amount of the executing service that can be restored to halt and restart execution of the service without altering the behavior of the executing service.

13. A system for debugging an executing service on a pipelined CPU architecture without hardware interlocks, the system comprising:
a debugger to set a breakpoint within an executing service and execute debug commands within the executing service;
wherein the debugger is further operable to set a program counter of the executing service to point to a save stub to save a minimum state of the executing service; and
a processing engine to execute the breakpoint,
wherein the debugger is further operable to set the program counter of the executing service to point to a restore stub to restore the state of the executing service, and wherein the debugger is further operable to determine if any executing service registers are unstable, save the value of any registers that change after each pipeline cycle if registers are unstable, save the old values of the registers before new values are written to the registers, and if the breakpoint location is set on a location that uses old values of registers.

14. The system of claim 13 wherein the debugger is further operable to locate an original instruction within the executing service to set the breakpoint, insert a breakpoint instruction at the breakpoint, start the executing service, wait for the breakpoint to execute, wait for memory fetches and configuration loads to complete, and restore the original instruction at the breakpoint location.

15. The system of claim 13 wherein the debugger is further operable to alter an instruction within the executing service at a breakpoint location, and invalidate a page cache of the executing service.

16. The system of claim 13 wherein the debugger is further operable to set a breakpoint register to point to a breakpoint location.

17. The system of claim 13 wherein the save stub is further operable to save the executing service registers.

18. The system of claim 13 wherein the processing engine is further operable to flush a pipeline of a set of pipeline instructions of the executing service.

19. The system of claim 13 wherein registers are scalar registers predicated registers.

20. The system of claim 13 wherein the debugger is further operable to start execution of the executing service, store configuration registers of the executing service, save values of the scalar and predicate registers, and save pipeline registers.

21. The system of claim 13 wherein the debugger is further operable to start the executing service at the breakpoint.

22. The system of claim 13 wherein the restore stub is further operable to:
if a breakpoint location is on an instruction that does not make use of old values, restore stable registers;
if the breakpoint location is on an instruction that does make use of old values,
restore unstable registers, and
reload the pipeline;
alter the program counter of the executing service to point to the breakpoint location; and
start execution of the executing service at the breakpoint location.

23. The system of claim 22 wherein the restore stub is further operable to reload the pipeline state directly.

24. The system of claim 22 wherein the restore stub is further operable to re-execute the original instructions within the pipeline to recreate the pipeline at a time of the breakpoint.

25. The system of claim 13 wherein the processing engine is further operable to:
fetch a page of memory of the executing service into an instruction cache; and
check for a checksum error within the page of memory.

26. The system of claim 13 wherein the debugger is further operable to:
if the executing service is set to reject the checksum error,
save the page of memory,
insert a breakpoint into the saved page of memory,
alter an instruction pointer to the saved page of memory, and
process the saved page of memory.

27. The system of claim 13, wherein the minimum state comprises a minimum amount of the executing service that can be restored to halt and restart execution of the service without altering the behavior of the executing service.

28. A system for debugging an executing service on a pipelined CPU architecture having a pipeline, the system comprising:
means for setting a breakpoint within an executing service;
means for saving a minimum state of the executing service;
means for setting a program counter of the executing service to point to a save stub;
means for setting the program counter of the executing service to point to a restore stub;
means for restoring the state of the executing service;
means for determining if registers are unstable;
if registers are unstable, means for saving the value of any registers that change after each pipeline cycle; and
if the breakpoint location is set on a location that uses old values of registers, means for saving the old values of the registers before new values are written to the registers.

29. The system of claim 28, wherein the means for saving a minimum state comprises means for saving a minimum amount of the executing service that can be restored to halt and restart execution of the service without altering the behavior of the executing service.

30. A computer readable medium comprising instructions, which when executed on a processor, perform a method for debugging an executing service on a pipelined CPU architecture having a pipeline, comprising:

setting a breakpoint within an executing service;

saving a minimum state of the executing service;

setting a program counter of the executing service to point to a save stub;

setting the program counter of the executing service to pint to a restore stub; and restoring the state of the executing service;

determining if registers are unstable;

if registers are unstable, saving the value of any registers that change after each pipeline cycle; and if the breakpoint location is set on a location that uses old values of registers, saving the old values of the registers before new values are written to the registers.

31. The computer readable medium of claim 30, wherein saving the minimum state further comprises saving a minimum amount of the executing service that can be restored to halt and restart execution of the service without altering the behavior of the executing service.

* * * * *